United States Patent
Panchaksharaiah et al.

(10) Patent No.: US 9,860,598 B1
(45) Date of Patent: Jan. 2, 2018

(54) METHODS AND SYSTEMS FOR CONTROLLING PRESENTATION OF MEDIA STREAMS

(71) Applicant: Rovi Guides, Inc., San Carlos, CA (US)

(72) Inventors: Vishwas Sharadanagar Panchaksharaiah, Karnataka (IN); Vikram Makam Gupta, Karnataka (IN)

(73) Assignee: Rovi Guides, Inc., San Carlos, CA (US)

( * ) Notice: Subject to any disclaimer, the term of this patent is extended or adjusted under 35 U.S.C. 154(b) by 0 days.

(21) Appl. No.: 15/450,276

(22) Filed: Mar. 6, 2017

(51) Int. Cl.
*H04N 21/4147* (2011.01)
*H04N 21/433* (2011.01)
*H04N 21/472* (2011.01)
*H04N 21/237* (2011.01)
*H04N 21/235* (2011.01)

(52) U.S. Cl.
CPC ..... *H04N 21/47208* (2013.01); *H04N 21/237* (2013.01); *H04N 21/2353* (2013.01)

(58) Field of Classification Search
CPC .......... H04N 21/4147; H04N 21/4331; H04N 21/4334
USPC .................................................. 725/131, 151
See application file for complete search history.

(56) References Cited

U.S. PATENT DOCUMENTS

| 2009/0193482 | A1* | 7/2009 | White | H04N 7/17318 725/110 |
| 2009/0317055 | A1* | 12/2009 | Iwami | H04N 5/782 386/291 |
| 2011/0102683 | A1* | 5/2011 | Josephs | H04N 21/23439 348/731 |
| 2014/0150045 | A1* | 5/2014 | Mochinaga | H04N 13/0454 725/116 |

* cited by examiner

*Primary Examiner* — Dominic D Saltarelli
(74) *Attorney, Agent, or Firm* — Haley Guiliano LLP

(57) ABSTRACT

Methods and systems for selecting a media stream for display based on reducing a time duration required to consume a media asset are presented herein. A first media stream, where the presentation of the media asset began at a first time, is generated for display. A second media stream, that started presenting the media asset at a second time, is stored in memory. The first media stream is generated for display for a time period and the stored second media stream is generated for display after this time period.

20 Claims, 7 Drawing Sheets

METHODS AND SYSTEMS FOR CONTROLLING PRESENTATION OF MEDIA STREAMS

BACKGROUND

Viewers don't always turn the television on at the exact time a media asset starts being presented on a media content source. For example, an initial portion of the media asset may already have been presented on the media content source when the viewer starts watching that media asset. Therefore, the viewer may not be able to view the complete media asset. This may be especially problematic for media assets transmitted over any media content source that is not a video on demand media content source.

SUMMARY

Methods and systems are presented herein for presenting an alternate media content source. A selection of a first media content source may be received at a first time. Presentation of the media asset on the first media content source may begin at a second time earlier than the first time. A media guidance application will search a program listings database for a second media content source presenting the same media asset. The presentation of the media asset on the second media content source may overlap in time with the presentation of the media asset on the first media content source. Based on the searching, the media guidance application may determine that the presentation of the media asset on the second media content source began at a third time, where the third time is later than the second time. In response to determining that the presentation of the media asset on the second media content source began at the third time later than the second time, the media guidance application may generate for display the media asset transmitted over the second media content source instead of the first media content source.

The media guidance application may determine a number of interesting portions in the media asset presented on the second media content source between the first time and a fourth time. The fourth time may be later than the first time. The media guidance application may determine that the number of interesting portions in the media asset presented on the second media content source exceeds the threshold. In response to determining that the number of interesting portions in the media asset presented on the second media content source exceeds the threshold, the media asset transmitted over the second media content source may be generated for display instead of the first media content source.

The media guidance application may determine the number of interesting portions in the media asset by parsing the media asset into a plurality of time segments. A first plurality of metadata tags associated with media content in each of the plurality of time segments of the media asset may be retrieved. Next, a second plurality of metadata tags indicating characteristics of interesting events may be retrieved. The retrieved first plurality of metadata tags may be compared to the retrieved second plurality of metadata tags.

Based on the comparison, it may be determined that at least one time segment of the plurality of time segments of the media asset is associated with a metadata tag that matches at least one metadata tag of the second plurality of metadata items. The at least one time segment of the plurality of time segments of the media asset that is associated with a metadata tag that matches at least one metadata tag of the second plurality of metadata tags may be determined to be an interesting portion of the media asset.

If the media guidance application determines that the number of interesting portions in the media asset presented on the second media content source does not exceed the threshold, then the media guidance application may generate for display the media asset transmitted over the first media content source.

In some embodiments the third time may be earlier than the second time. In response to determining that the third time is earlier than the second time, the media asset transmitted over the first media content source may be generated for display. In some embodiments, generating for display the media asset transmitted over the second media content source instead of the first media content source may optionally include generating for display an option prompting a user to instruct the media guidance application to generate for display the media asset transmitted over the second media content source.

In some embodiments, based on the searching, the media guidance application may determine a first plurality of media content sources where the presentation of the media asset on each of the first plurality of media content sources overlaps in time with the presentation of the media asset on the first media content source. A second plurality of media content sources may be determined from the first plurality of media content sources, where the presentation of the media asset on each of the second plurality of media content sources began at a fourth time later than the second time and earlier than the first time. The media guidance application may generate for display the media asset transmitted over a third media content source, selected from the second plurality of media content sources, where the presentation of the media asset on the third media content source began after the presentation of the media asset began on every other media content source of the second plurality of media content sources.

In some embodiments, the number of advertisements presented on the second media content source between the first time and the fourth time may be determined by the media guidance application. The fourth time may be later than the first time. It may be determined that the number of advertisements presented on the second media content source between the first time and the fourth time exceeds a threshold. In response to determining that the number of advertisements presented on the second media content source between the first time and the fourth time exceeds the threshold, the media asset transmitted over the first media content source may be generated for display.

In some embodiments, a preferred language may be retrieved from memory by the media guidance application. It may be determined that the media asset presented on the second media content source is not in the preferred language, and in response to determining that the media asset presented on the second media content source is not in the preferred language, the media asset transmitted over the first media content source may be generated for display.

Methods and systems for selecting a media stream for display based on reducing a time duration required to consume a media asset are additionally presented herein. The terms media stream and media content source are used interchangeably herein. The media guidance application may generate for display a first media stream where the presentation of the media asset on the first media stream began at a first time. A program listings database may be searched for a second media stream presenting the same media asset such that the presentation of the media asset on the second media stream: (i) overlaps in time with the presentation of the media asset on the first media stream, and (ii) began at a second time earlier than the first time. In some embodiments, the second time may be later than or the same as the first time. The second media stream may be stored in memory and a time duration between the first time and the second time may be computed. The media guidance application may continue to generate for display the first media stream for the time duration and the media guidance application may generate for display the stored second media stream after the time duration.

In some embodiments, computing the first time duration may further include: determining that the second media stream included an advertisement between the first time and the second time, computing a second time duration corresponding to the length of that advertisement, and subtracting the second time duration from the first time duration.

In some embodiments, searching the program listings database may further include finding a plurality of media streams presenting the same media asset such that the presentation of the media asset on each of the plurality of media streams overlaps in time with the presentation of the media asset on the first media stream and began at a time earlier than the first time. The media stream of plurality of media streams on which the presentation of the media asset began earliest in time may be selected as the second media stream.

In some embodiments, storing the second media stream may further include identifying a location of an advertisement in the second media stream and storing the second media stream without the advertisement at the location identified in the second media stream. In some embodiments, generating for display the stored second media stream may further include identifying a location of an advertisement in the stored second media stream and generating for display the stored second media stream without the advertisement at the location identified in the second media stream. In some embodiments, an option prompting a user to watch the advertisement before generating for a display the stored second media stream after the time duration may be generated for display.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
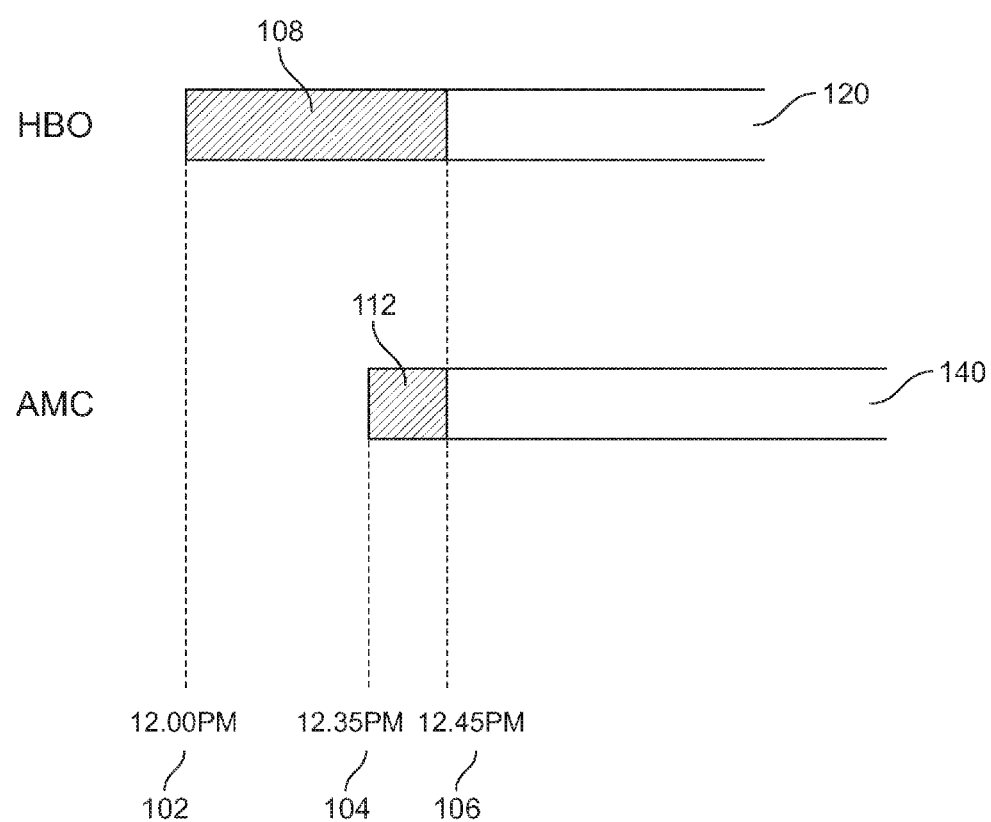
FIG. 1 depicts an illustrative embodiment of determining an alternate media content source, in accordance with some embodiments of the disclosure.

FIG. 1 depicts an illustrative embodiment of determining an alternate media content source, in accordance with some embodiments of the disclosure.

HBO 120 and AMC 140 are the first media content source and the second media content source respectively. Both media content sources may be presenting or transmitting the same media asset. For example, both media content sources HBO 120 and AMC 140 may present the same movie Ironman. However, media content source HBO 120 and media content source AMC 140 could have started presenting Ironman at different times. For example, media content source HBO 120 may have started presenting Ironman at time 102, say 12:00 pm, and media content source AMC 140 may have started presenting Ironman at time 104, say 12:35 pm. In this case, when a user starts watching Ironman on media content source HBO 120 at time 106, say 12:45 pm, the user may have already missed a portion of the movie. In particular, the user may have missed the portion of Ironman presented between times 106 and 102, that is, 45 minutes of the movie. This corresponds to area 108 of the media asset presented on media content source HBO 120.

Continuing the above example, the media guidance application may assess that media content source AMC 140 may have started presenting Ironman at time 104, that is 12:35 pm, which is later than time 102, that is 12:00 pm, at which time media content source HBO 120 started presenting Ironman. If the user switches to media content source AMC 140 at time 106, the user would miss a portion of Ironman corresponding to the time duration between time 106, that is 12:45 pm, and time 104, that is 12:35 pm, i.e., 10 minutes of Ironman. This corresponds to area 112 of the media asset being presented on media content source AMC 140. Accordingly, the media guidance application may prompt the user to switch to watching Ironman on media content source AMC 140 instead of media content source HBO 120. In some embodiments the media guidance application may switch presentation of the movie Ironman being transmitted over media content source HBO 120 to media content source AMC 140 automatically.

In some embodiments, the media guidance application may consider other factors in making a decision on whether to switch presentation of the media asset from media content source HBO 120 to media content source AMC 140. Some exemplary factors could include: (1) other media content sources that are presenting the same media asset, (2) a number of interesting events in the portion of the media asset that the user would have missed had she continued watching the media asset on media content source HBO 120, (3) language preferences of the user, (4) the number, length, and duration of advertisements, and (5) the presence of subtitles. Other factors or any suitable combination of the factors listed above could be used by the media guidance application in making a decision on whether to switch presentation of the media asset from media content source HBO 120 to media content source AMC 140.

The media guidance application may determine whether any media content sources other than media content source HBO 120 are presenting the media asset currently being presented by media content source HBO 120. If a presentation of the same media asset on the other media content sources overlaps with the presentation of the media asset on media content source HBO 120 then the media guidance application may perform further analysis as discussed in detail below. If not, the media guidance application may present the same media asset transmitted over media content source AMC 140 instead of media content source HBO 120.

If a presentation of the same media asset on the other media content sources overlaps with the presentation of the media asset on media content source HBO 120, the media guidance application may determine whether the other media content sources started presenting the same media asset after the time at which media content source HBO 120 started presenting the media asset, then the media guidance application may perform further analysis on whether to switch presentation of the media asset to one of these other media content sources. If not, the media guidance application may present the media asset transmitted over media content source AMC 140 instead of media content source HBO 120.

If the other media content sources started presenting the same media asset after the time at which media content source HBO 120 started presenting the media asset, the media guidance application may determine whether the other media content sources started presenting the same media asset at a time later than a time at which media content source AMC 140 started presenting the media asset. If the other media content sources started presenting the media asset earlier than the time at which media content source AMC 140 started presenting the media asset, then the media guidance application may generate for display the media asset transmitted over media content source AMC 140 instead of media content source HBO 120. Otherwise, the media guidance application may select one of the other media content sources, on which the presentation of the media asset started latest in time, and generate for display the media asset being presented on one of these other media content sources.

The media guidance application may determine a number of interesting events in the portion of the media asset that the user would have missed watching had she continued watching the media asset on media content source HBO 120 at time 106. In the example presented above, the portion of the media asset during which the presence and/or the number of interesting events is calculated may begin at time 106, i.e., 12.45 pm, and last for a time duration Z=X-Y=35 minutes, where X=time 106-time 102=45 minutes, and Y=time 106-time 104=10 mins. In some embodiments, the duration of any advertisements included in time slots X and Y may be subtracted from time lengths X and Y. This is described in detail below. Examples of interesting events may include goals, near misses, great passes, fouls, for example, if the media asset being watched is a soccer game. In another example, if the media asset being watched is a movie, then key plot points or popular action sequences or funny moments or the most dramatic scenes of the movie may constitute interesting events.

To identify interesting portions of the media asset, the media asset may be parsed into several portions by the media guidance application. The portions may correspond to time segments of the media asset. The time segments may be uniform or not uniform. The time segments of the media asset may be processed to determine the content characteristics of each time segment of the media asset. For example, the media asset may be parsed into equal time segments of length 2 minutes. Alternatively, the media asset may be parsed into time segments of varying lengths. For example, while some time segments may be 2 minutes long, other time segments may be 10 minutes long. These time segment length values are merely exemplary and any other suitable time values may also be selected.

The time segments of the media asset may be processed to determine content characteristics of the media content within those time segments. Content characteristics such as the genre, e.g., action, drama, comedy, romance, science fiction, or any other suitable genre, may be determined. Other content characteristics may include the actors appearing in that time segment of the media asset, various objects depicted in that time segment of the media asset, various geographical locations appearing in that time segment, or any suitable combination thereof. Further content characteristics may include the mood of that particular time segment, e.g., whether content in that time segment of the media asset is happy, sad, or exciting.

For any given content characteristic, the time segments of the parsed media asset may be ranked based on the presence, absence, or amount of that content characteristic within a time segment. For example, if the content characteristic is "Tom Cruise," time segments in a parsed media asset may be ranked from highest to lowest based on the degree of presence of "Tom Cruise" within that media asset. In particular, the ranking of a time segment for the presence of "Tom Cruise" may be higher the longer Tom Cruise appears in that particular time segment, or the more frequently Tom Cruise is mentioned in that particular time segment.

The content characteristics determined by the media guidance application for the time segments of the parsed media asset may be indicated in metadata associated with the respective time segments of the media asset. For example, each time segment of the media asset processed by the media guidance application may be associated with metadata. The metadata may include entries for each content characteristic. For example, a time segment corresponding to an action sequence from a "Mission Impossible" movie may have metadata associated with "Tom Cruise" and action.

The media guidance application may consider the language preferences of the user. Continuing the earlier example, if media content source HBO 120 is presenting Ironman in English and media content source AMC 140 is presenting Ironman in Spanish, the media guidance application may determine the user's preferred language for watching media content based on the user's profile. If the media guidance application determines that the user's preferred language is Spanish, then the media guidance application may switch presentation of Ironman to the media content source AMC 140. Otherwise, if the user's preferred language is English, the media guidance application may continue generating for display Ironman being presented on media content source HBO 120 even though the user would have missed more of the movie Ironman on media content source HBO 120.

The media guidance application may determine the number, the length, and the duration of advertisements being presented during the media asset transmitted over media content source AMC 140 and/or other media content sources presenting the same media asset as media content source HBO 120. The media guidance application may determine whether any advertisements were presented in the portion of the media asset that the user missed watching had she continued watching the media asset on media content source HBO 120. The presence of advertisements may be determined in a number of ways, as discussed in detail below.

For example, advertisements may be detected by parsing the media asset into a plurality of portions and then evaluating a metadata tag characterizing each of those plurality of portions. The media asset may be parsed in a manner similar to the manner in which the media asset is parsed to determine interesting portions of the media asset. Metadata tags may identify the presence or absence of an advertisement in each portion of the parsed media asset.

For example, the media guidance application may rely on third party sources for information on the locations of advertisements in the media asset. Advertisement location information may indicate the time points in a media asset at which respective advertisements start and end. For example, the media guidance application may search the media asset for tags that bookend advertisements presented in the media asset. Any the other suitable technique for determining the presence of advertisements or a combination of the techniques discussed above may be used by the media guidance application.

The media guidance application may determine the duration of any identified advertisement. For example, if the media guidance application determines the presence of advertisements by parsing the media asset into a plurality of portions and then analyzing metadata tags associated with each of those portions, then the duration of advertisements may be determined calculating the time length of adjacent portions of the media asset that are associated with metadata tags indicating the presence of an advertisement. If the media guidance application used location information received from third party sources to determine the presence of an advertisement, then the duration of an advertisement may be determined by subtracting the time location at which an advertisement began from the time location at which an advertisement ended. A similar technique for determining the duration of an advertisement may be used if the media guidance application determined the presence of an advertisement by examining tags bookending respective advertisements.

The media guidance application may determine the type of an advertisement included in a media asset. Exemplary types of advertisements include advertisements that are overlaid on the media asset, banner advertisements that are presented simultaneously on a screen with the media asset, video advertisements that are presented interstitially with a media asset, or any other suitable combination of the types of advertisements discussed above.

The media guidance application may switch presentation of the media asset to media content source AMC 140 if one or more of the criteria discussed below are satisfied: (1) the number of advertisements is below a customizable threshold, (2) the duration of the advertisements is below a customizable threshold, and (3) the type of advertisement is acceptable to the user based on the user's profile. For example, if a user profile indicates that a user does not like overlay advertisements, then the media guidance application may avoid presenting the media asset on a media content source that includes overlay advertisements.

The media guidance application may determine whether subtitles are present on a media content source. In particular, the media guidance application may determine whether subtitles are present in the portion of the media asset that the use will have missed had she continued watching the media asset on media content source HBO 120. The media guidance application may analyze the user's profile for user preferences on subtitles. For example, the media guidance application may determine whether the user likes to view subtitles or doesn't like to view subtitles, the language in which the user likes to view subtitles, or graphical characteristics that the user prefers for the presentation of subtitles. The media guidance application may switch presentation of the media asset to a media content source on which the presentation of subtitles matches the user's preference for subtitles. Otherwise the media guidance application may continue presenting the media asset on media content source HBO 120 even though the user may miss watching a greater portion of the media asset on media content source HBO 120.

Figure 2:
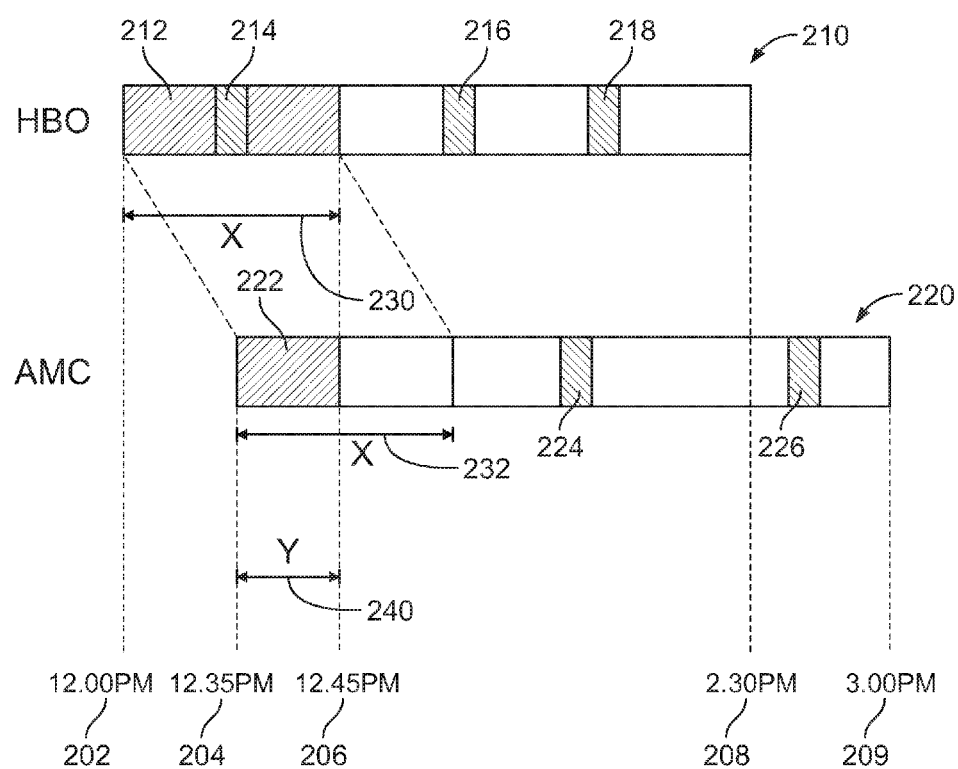
FIG. 2 depicts an illustrative embodiment of controlling the presentation of media streams, in accordance with some embodiments of the disclosure.

FIG. 2 depicts an illustrative embodiment of controlling the presentation of media streams, in accordance with some embodiments of the disclosure. Like FIG. 1, FIG. 2 shows two media content sources, HBO 210 and AMC 220. Both media content sources may be presenting the same media asset. Media content source HBO 210 may include advertisements 214, 216, and 218. Media content source AMC 220 may include advertisements 224 and 226. For example, media content source HBO 210 and media content source AMC 220 may be presenting the same movie Ironman. The terms media content source and media stream are used interchangeably herein.

The presentation of Ironman on media content source HBO 210 may start at a different time than the presentation of Ironman on media content source AMC 220. For example, media content source HBO 210 may have started presenting Ironman at time 202, say 12:00 pm, while media content source AMC 220 may have started presenting Ironman at time 204, say 12:35 pm. This is merely exemplary. For example, media content source AMC 220 may start presenting Ironman at time 204 earlier than or at the same time as time 202. Accordingly, because the presentation of Ironman on media content source 210 and media content source AMC 220 began at different times, that is, time 202 and time 204 respectively, the presentation of Ironman on each of these media content sources will end at a different time. For example, the presentation of Ironman on media content source HBO 210 may end at time 208, say 2:30 pm, and the presentation of Ironman on media content source AMC 220 may end at time 209, say 3:00 pm.

If a user starts watching a media asset on media content source HBO 210 at time 206, say 12:45 pm, then the user would have already missed a portion of that media asset because the presentation of that media asset on media content source HBO 210 began at time 202, that is 12:00 pm. Specifically, the user will have missed a time duration X 230 of the media asset. Time duration X 230 may be computed as the difference between time 206, that is 12:45 pm, and time 202, that is 12:00 pm. Therefore, in the above example, time duration X 230 will have a value of 45 minutes. Accordingly, the portion of the media asset on media content source HBO 210 that the user has missed because the user started watching the media asset on media content source HBO 210 at some point after the presentation of that media asset began on media content source HBO 210 is indicated by area 212.

As discussed in connection with FIG. 1 above, the media guidance application may register that the presentation of the media asset began on media content source AMC 220 at time 204, that is 12:35 pm, after time 202, that is 12:00 pm, when the media content source HBO 210 started presenting the media asset. Accordingly, the media guidance application may switch to generating for display the presentation of the media asset transmitted over media content source AMC 220 because the user would miss less of the media asset on media content source AMC 220. Specifically, if at time 206, that is 12:45 pm, the user started watching the media asset on media content source AMC 220 the user would have only missed time duration Y 240. Time duration Y 240 may be computed as the difference between time 206, that is 12:45 pm, and time 204, that is 12:35 pm, yielding a value of ten minutes in the above example. This is indicated by area 222 of the media asset transmitted over media content source AMC 220.

In some embodiments, the media guidance application may begin recording media content source HBO 210 in the background. Alternatively, the user may be prompted before the media guidance application begins recording media content source HBO 210. Media content source HBO 210 may be recorded locally or remotely using memory 508. The media guidance application may begin recording media content source HBO 210 at time 206, i.e., 12:45 pm. Based on the techniques for determining the presence and duration of advertisements discussed in connection with FIG. 1 above, the media guidance application may omit recording advertisements being presented on media content source HBO 210. For example, if the media guidance application relied on third party sources for information indicating the start and end points of advertisements in a media asset, then the media guidance application may pause the recording of the media content source HBO 210 between the start location and end location of an advertisement on the media content source. Alternatively, media content source HBO 210 may be recorded in its entirety including advertisements but playback of advertisements may be omitted when media content source HBO 210 is played back. For example, if the media guidance application parsed the media asset into a plurality of portions and determined the presence and/or duration of advertisements by the analysis of metadata tags, then during playback of that media asset, any portion of the media asset corresponding to a metadata tag indicating the presence of an advertisement may be omitted from playback.

In some embodiments, the media guidance application may permit play back of advertisements included in the recorded media content source HBO 210 only if the user performs an appropriate action in lieu of watching those advertisements. For example, if the user agrees to pay a fee or agrees to watch all advertisements at once before proceeding to watch the remainder of the media asset, then advertisements may be omitted from the playback of the media asset.

The media guidance application may determine the duration of the media asset that the user has already missed when she started watching the media asset on media content source HBO 210 at time 206, that is 12:45 pm. In particular, the media guidance application may compute the presentation of the media asset's actual content that the user has missed excluding any advertisements. The presence and duration of advertisements may be determined as discussed in connection with FIG. 1 above. Specifically, the duration of the media asset that the user has missed watching on media content source HBO 210, if the user starts watching the media asset at time 206, may be denoted by time duration X'. The value of time duration X' may be computed as time duration X 230 minus the time duration of advertisements presented on media content source HBO 210 between time 202, that is 12:00 pm, and time 206, that is 12:45 pm. For example, assuming that the media asset presented on media content source HBO 210 in the time duration specified above had only one advertisement of duration 5 minutes, then time duration X' has a value of 45−5=40 minutes. Accordingly, the media guidance application may record media content source HBO 210 for at least time duration X'. When the user has completed watching time duration X' minutes of the media asset starting from time 206, that is 12:45 pm, on media content source AMC 220 the media guidance application may switch to generating for display the media asset being presented on the recorded media content source HBO 210.

Continuing the prior example, when the user has watched time duration X' minutes of the media asset starting from time 206, that is 12:45 pm, on media content source AMC 220 the user will have reached a time point of X'+Y=40+10=50 minutes into the media asset. However, in the time duration of X' minutes (40 minutes), the media asset on media content source HBO 210, which the media guidance application started recording 45 minutes after the presentation of the media asset began on media content source HBO 210, would have reached the time point X+X'=45+40=85 minutes. Therefore, at time X' minutes from time 206, that is 1:25 pm, the media guidance application would have recorded a portion of the media asset from a time point starting at 45 minutes of the media asset to a time point at 85 minutes of the media asset. In other words, the media guidance application would have buffered the media asset up to 40 minutes ahead from the user's current viewing point of the media asset. Because the media asset has been recorded further ahead from the user's current viewing location in the media asset transmitted over media content source AMC 220, the user will not miss watching any portion of the media asset when the media guidance application switches to playing back the media asset on recorded media content source HBO 210. Furthermore, because advertisements may be omitted from recording or alternatively may be recorded but not played back, the user will finish watching the media asset on recorded media content source HBO 210 at a time earlier than time 209, that is 3:00 pm, which was the scheduled end time of the media asset transmitted over media content source AMC 220.

In some instances, the user may finish watching the media asset at time 208, that is 2:30 pm, which is the scheduled time the media asset was to finish on media content source HBO 210, and which is earlier than time 209, that is 3:00 pm. For example, this may occur when the duration of advertisements in the media asset between time locations X' minutes from time 206, i.e., 1:25 pm, is greater than the time difference between time 209 and time 208.

The media guidance application may search a program listings database or any other appropriate source of media content for additional media content sources presenting the same media asset being presented on media content source HBO 210. For example, the media guidance application may find a video on demand media content source presenting the media asset. Continuing the prior example, the media guidance application may recognize that the user wants to watch Ironman when the user chooses media content source HBO 210 at time 206, that is 12:45 pm, at which time media content source HBO 210 is presenting Ironman. Accordingly, because the media guidance application determines that the user has already missed watching a portion of Ironman on media content source HBO 210, the media guidance application may look for Ironman on other media content sources. It may find that Ironman is available from video on demand media content sources, such as the Apple Store or Amazon video. The media guidance application may accordingly present Ironman to the user from the very beginning. Specifically, the user may be presented Ironman through the video on demand media content source for the duration Y 230 (10 minutes).

The media guidance application may begin recording the media asset being presented on media content source AMC 220 as well as the media asset being presented on media content source HBO 210 at time 206, that is 12:45 pm. The media assets on both these media content sources may be recorded in parallel. As discussed in connection with FIG. 1 above, advertisements being presented on these media content sources may either be omitted from the recording or be omitted from playback.

Continuing the prior example, after the viewer has viewed the portion of Ironman on the video on demand media content source for a time duration corresponding to Y 230 that she had missed watching on media content source AMC 220, the media guidance application may generate for display Ironman from the media asset recorded on media content source AMC 220. At this point in time, which is time 206+Y=12.45 pm+10=12:55 pm, time duration Y 230 (10 minutes) of the media asset on media content source AMC 210 would have been recorded. After the user has watched the media asset on recorded media content source AMC 220 for a time duration Y 230 (10 minutes) the media guidance application may generate for display Ironman from the media asset on recorded media content source HBO 210. At this point in time, which is time 206+Y+Y=12.45 pm+10+10=1:05 pm, the media asset on media content source HBO 210 would have been recorded for a time duration of Y+Y=20 minutes.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms.

Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 3:
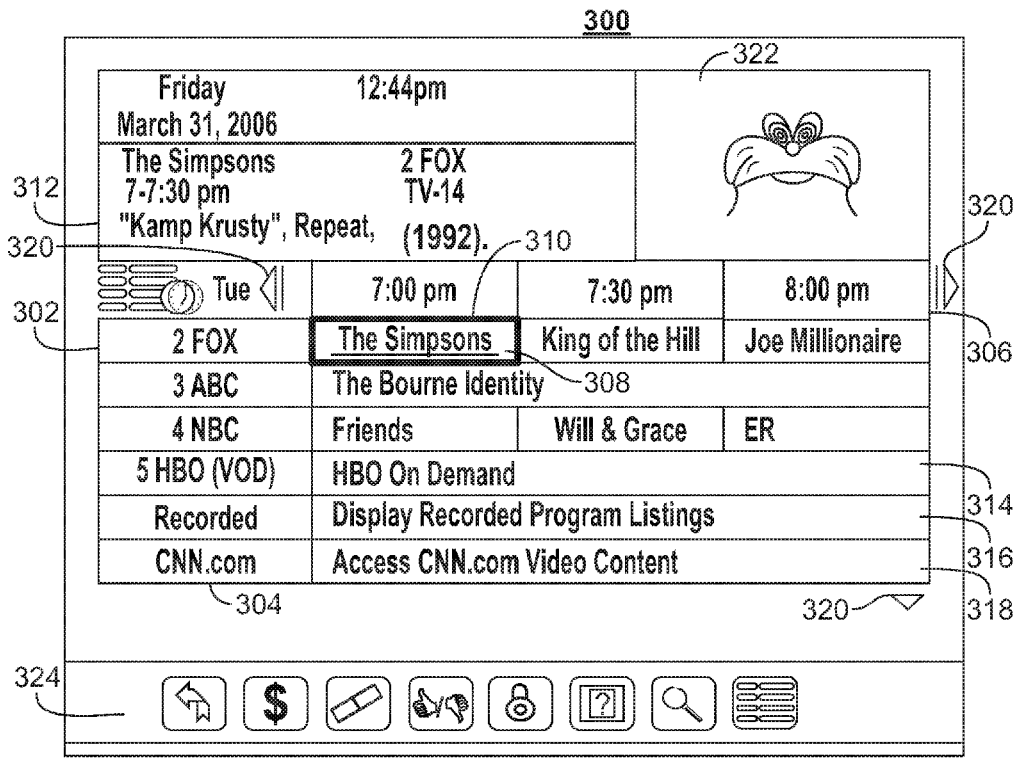
FIG. 3 shows an illustrative embodiment of a display screen that may be used to provide media guidance application listings and other media guidance information, in accordance with some embodiments of the disclosure.
Figure 4:
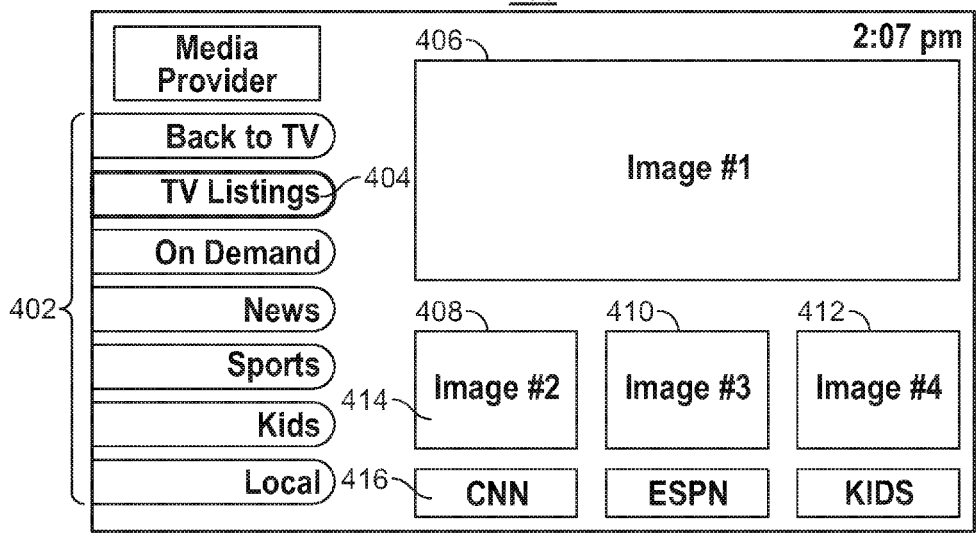
FIG. 4 shows another illustrative embodiment of a display screen that may be used to provide media guidance application listings, in accordance with some embodiments of the disclosure.

FIGS. 3-4 show illustrative display screens that may be used to provide media guidance data. The display screens shown in FIGS. 3-4 may be implemented on any suitable user equipment device or platform. While the displays of FIGS. 3-4 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 3 shows illustrative grid of a program listings display 300 arranged by time and channel that also enables access to different types of content in a single display. Display 300 may include grid 302 with: (1) a column of channel/content type identifiers 304, where each channel/content type identifier (which is a cell in the column) identifies a different channel or content type available; and (2) a row of time identifiers 306, where each time identifier (which is a cell in the row) identifies a time block of programming. Grid 302 also includes cells of program listings, such as program listing 308, where each listing provides the title of the program provided on the listing's associated channel and time. With a user input device, a user can select program listings by moving highlight region 310. Information relating to the program listing selected by highlight region 310 may be provided in program information region 312. Region 312 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 302 may provide media guidance data for non-linear programming including on-demand listing 314, recorded content listing 316, and Internet content listing 318. A display combining media guidance data for content from different types of content sources is sometimes referred to as a "mixed-media" display. Various permutations of the types of media guidance data that may be displayed that are different than display 300 may be based on user selection or guidance application definition (e.g., a display of only recorded and broadcast listings, only on-demand and broadcast listings, etc.). As illustrated, listings 314, 316, and 318 are shown as spanning the entire time block displayed in grid 302 to indicate that selection of these listings may provide access to a display dedicated to on-demand listings, recorded listings, or Internet listings, respectively. In some embodiments, listings for these content types may be included directly in grid 302. Additional media guidance data may be displayed in response to the user selecting one of the navigational icons 320. (Pressing an arrow key on a user input device may affect the display in a similar manner as selecting navigational icons 320.)

Display 300 may also include video region 322, advertisement 324, and options region 326. Video region 322 may allow the user to view and/or preview programs that are currently available, will be available, or were available to the user. The content of video region 322 may correspond to, or be independent from, one of the listings displayed in grid 302. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 324 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 302. Advertisement 324 may also be for products or services related or unrelated to the content displayed in grid 302. Advertisement 324 may be selectable and provide further information about content, provide information about a product or a service, enable purchasing of content, a product, or a service, provide content relating to the advertisement, etc. Advertisement 324 may be targeted based on a user's profile/preferences, monitored user activity, the type of display provided, or on other suitable targeted advertisement bases.

While advertisement 324 is shown as rectangular or banner shaped, advertisements may be provided in any suitable size, shape, and location in a guidance application display. For example, advertisement 324 may be provided as a rectangular shape that is horizontally adjacent to grid 302. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 326 may allow the user to access different types of content, media guidance application displays, and/or media guidance application features. Options region 326 may be part of display 300 (and other display screens described herein), or may be invoked by a user by selecting an on-screen option or pressing a dedicated or assignable button on a user input device. The selectable options within options region 326 may concern features related to program listings in grid 302 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.Tivo.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 6. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 4. Video mosaic display 400 includes selectable options 402 for content information organized based on content type, genre, and/or other organization criteria. In display 400, television listings option 404 is selected, thus providing listings 406, 408, 410, and 412 as broadcast program listings. In display 400 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 408 may include more than one portion, including media portion 414 and text portion 416. Media portion 414 and/or text portion 416 may be selectable to view content in full-screen or to view information related to the content displayed in media portion 414 (e.g., to view listings for the channel that the video is displayed on).

The listings in display 400 are of different sizes (i.e., listing 406 is larger than listings 408, 410, and 412), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 5:
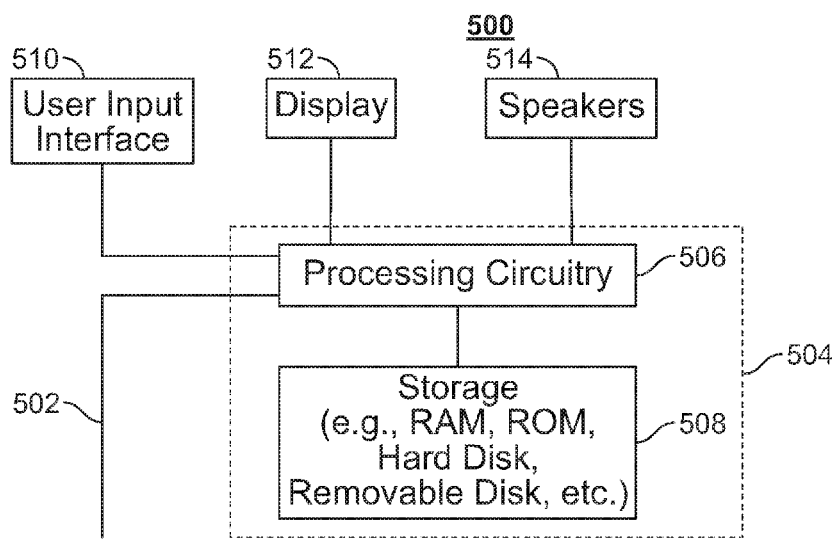
FIG. 5 is a block diagram of an illustrative user equipment (UE) device in accordance with some embodiments of the disclosure.

Users may access content and the media guidance application (and its display screens described above and below) from one or more of their user equipment devices. FIG. 5 shows a generalized embodiment of illustrative user equipment device 500. More specific implementations of user equipment devices are discussed below in connection with FIG. 6. User equipment device 500 may receive content and data via input/output (hereinafter "I/O") path 502. I/O path 502 may provide content (e.g., broadcast programming, on-demand programming, Internet content, content available over a local area network (LAN) or wide area network (WAN), and/or other content) and data to control circuitry 504, which includes processing circuitry 506 and storage 508. Control circuitry 504 may be used to send and receive commands, requests, and other suitable data using I/O path 502. I/O path 502 may connect control circuitry 504 (and specifically processing circuitry 506) to one or more communications paths (described below). I/O functions may be provided by one or more of these communications paths, but are shown as a single path in FIG. 5 to avoid overcomplicating the drawing.

Control circuitry 504 may be based on any suitable processing circuitry such as processing circuitry 506. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 504 executes instructions for a media guidance application stored in memory (i.e., storage 508). Specifically, control circuitry 504 may be instructed by the media guidance application to perform the functions discussed above and below. For example, the media guidance application may provide instructions to control circuitry 504 to generate the media guidance displays. In some implementations, any action performed by control circuitry 504 may be based on instructions received from the media guidance application.

In client-server based embodiments, control circuitry 504 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 6). In addition, communications circuitry may include circuitry that enables peer-to-peer communication of user equipment devices, or communication of user equipment devices in locations remote from each other (described in more detail below).

Memory may be an electronic storage device provided as storage 508 that is part of control circuitry 504. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 508 may be used to store various types of content described herein as well as media guidance data described above. Nonvolatile memory may also be used (e.g., to launch a boot-up routine and other instructions). Cloud-based storage, described in relation to FIG. 6, may be used to supplement storage 508 or instead of storage 508.

Control circuitry 504 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 504 may also include scaler circuitry for upconverting and downconverting content into the preferred output format of the user equipment 500. Circuitry 504 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 508 is provided as a separate device from user equipment 500, the tuning and encoding circuitry (including multiple tuners) may be associated with storage 508.

A user may send instructions to control circuitry 504 using user input interface 510. User input interface 510 may be any suitable user interface, such as a remote control, mouse, trackball, keypad, keyboard, touch screen, touchpad, stylus input, joystick, voice recognition interface, or other user input interfaces. Display 512 may be provided as a stand-alone device or integrated with other elements of user equipment device 500. For example, display 512 may be a touchscreen or touch-sensitive display. In such circumstances, user input interface 510 may be integrated with or combined with display 512. Display 512 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 512 may be HDTV-capable. In some embodiments, display 512 may be a 3D display, and the interactive media guidance application and any suitable content may be displayed in 3D. A video card or graphics card may generate the output to the display 512. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 504. The video card may be integrated with the control circuitry 504. Speakers 514 may be provided as integrated with other elements of user equipment device 500 or may be stand-alone units. The audio component of videos and other content displayed on display 512 may be played through speakers 514. In some embodiments, the audio may be distributed to a receiver (not shown), which processes and outputs the audio via speakers 514.

The guidance application may be implemented using any suitable architecture. For example, it may be a stand-alone application wholly-implemented on user equipment device 500. In such an approach, instructions of the application are stored locally (e.g., in storage 508), and data for use by the application is downloaded on a periodic basis (e.g., from an out-of-band feed, from an Internet resource, or using another suitable approach). Control circuitry 504 may retrieve instructions of the application from storage 508 and process the instructions to generate any of the displays discussed herein. Based on the processed instructions, control circuitry 504 may determine what action to perform when input is received from input interface 510. For example, movement of a cursor on a display up/down may be indicated by the processed instructions when input interface 510 indicates that an up/down button was selected.

In some embodiments, the media guidance application is a client-server based application. Data for use by a thick or thin client implemented on user equipment device 500 is retrieved on-demand by issuing requests to a server remote to the user equipment device 500. In one example of a client-server based guidance application, control circuitry 504 runs a web browser that interprets web pages provided by a remote server. For example, the remote server may store the instructions for the application in a storage device. The remote server may process the stored instructions using circuitry (e.g., control circuitry 504) and generate the displays discussed above and below. The client device may receive the displays generated by the remote server and may display the content of the displays locally on equipment device 500. This way, the processing of the instructions is performed remotely by the server while the resulting displays are provided locally on equipment device 500. Equipment device 500 may receive inputs from the user via input interface 510 and transmit those inputs to the remote server for processing and generating the corresponding displays. For example, equipment device 500 may transmit a communication to the remote server indicating that an up/down button was selected via input interface 510. The remote server may process instructions in accordance with that input and generate a display of the application corresponding to the input (e.g., a display that moves a cursor up/down). The generated display is then transmitted to equipment device 500 for presentation to the user.

In some embodiments, the media guidance application is downloaded and interpreted or otherwise run by an interpreter or virtual machine (run by control circuitry 504). In some embodiments, the guidance application may be encoded in the ETV Binary Interchange Format (EBIF), received by control circuitry 504 as part of a suitable feed, and interpreted by a user agent running on control circuitry 504. For example, the guidance application may be an EBIF application. In some embodiments, the guidance application may be defined by a series of JAVA-based files that are received and run by a local virtual machine or other suitable middleware executed by control circuitry 504. In some of such embodiments (e.g., those employing MPEG-2 or other digital media encoding schemes), the guidance application may be, for example, encoded and transmitted in an MPEG-2 object carousel with the MPEG audio and video packets of a program.

Figure 6:
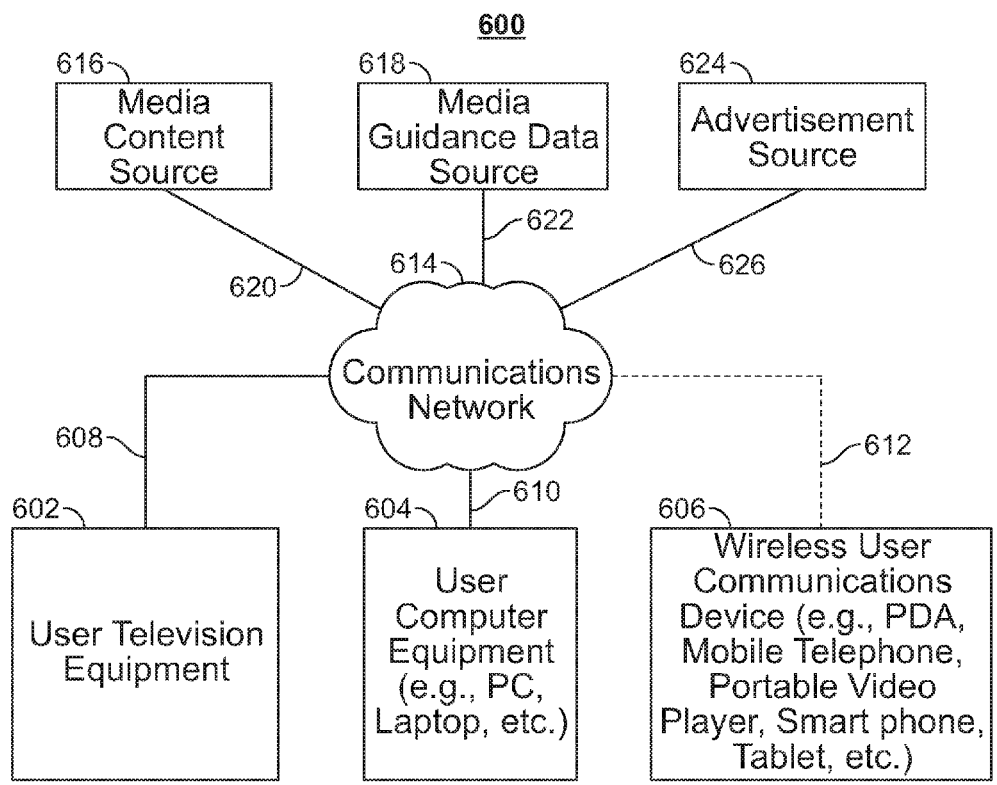
FIG. 6 is a block diagram of an illustrative media system in accordance with some embodiments of the disclosure.

User equipment device 500 of FIG. 5 can be implemented in system 600 of FIG. 6 as user television equipment 602, user computer equipment 604, wireless user communications device 606, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 5 may not be classified solely as user television equipment 602, user computer equipment 604, or a wireless user communications device 606. For example, user television equipment 602 may, like some user computer equipment 604, be Internet-enabled allowing for access to Internet content, while user computer equipment 604 may, like some user television equipment 602, include a tuner allowing for access to television programming. The media guidance application may have the same layout on various different types of user equipment or may be tailored to the display capabilities of the user equipment. For example, on user computer equipment 604, the guidance application may be provided as a web site accessed by a web browser. In another example, the guidance application may be scaled down for wireless user communications devices 606.

In system 600, there is typically more than one of each type of user equipment device but only one of each is shown in FIG. 6 to avoid overcomplicating the drawing. In addition, each user may utilize more than one type of user equipment device and also more than one of each type of user equipment device.

In some embodiments, a user equipment device (e.g., user television equipment 602, user computer equipment 604, wireless user communications device 606) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.Tivo.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 614. Namely, user television equipment 602, user computer equipment 604, and wireless user communications device 606 are coupled to communications network 614 via communications paths 608, 610, and 612, respectively. Communications network 614 may be one or more networks including the Internet, a mobile phone network, mobile voice or data network (e.g., a 4G or LTE network), cable network, public switched telephone network, or other types of communications network or combinations of communications networks. Paths 608, 610, and 612 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 612 is drawn with dotted lines to indicate that in the exemplary embodiment shown in FIG. 6 it is a wireless path and paths 608 and 610 are drawn as solid lines to indicate they are wired paths (although these paths may be wireless paths, if desired). Communications with the user equipment devices may be provided by one or more of these communications paths, but are shown as a single path in FIG. 6 to avoid overcomplicating the drawing.

Although communications paths are not drawn between user equipment devices, these devices may communicate directly with each other via communication paths, such as those described above in connection with paths 608, 610, and 612, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 614.

System 600 includes content source 616 and media guidance data source 618 coupled to communications network 614 via communication paths 620 and 622, respectively. Paths 620 and 622 may include any of the communication paths described above in connection with paths 608, 610, and 612. Communications with the content source 616 and media guidance data source 618 may be exchanged over one or more communications paths, but are shown as a single path in FIG. 6 to avoid overcomplicating the drawing. In addition, there may be more than one of each of content source 616 and media guidance data source 618, but only one of each is shown in FIG. 6 to avoid overcomplicating the drawing. (The different types of each of these sources are discussed below.) If desired, content source 616 and media guidance data source 618 may be integrated as one source device. Although communications between sources 616 and 618 with user equipment devices 602, 604, and 606 are shown as through communications network 614, in some embodiments, sources 616 and 618 may communicate directly with user equipment devices 602, 604, and 606 via communication paths (not shown) such as those described above in connection with paths 608, 610, and 612.

Content source 616 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 616 may be the originator of content (e.g., a television broadcaster, a Webcast provider, etc.) or may not be the originator of content (e.g., an on-demand content provider, an Internet provider of content of broadcast programs for downloading, etc.). Content source 616 may include cable sources, satellite providers, on-demand providers, Internet providers, over-the-top content providers, or other providers of content. Content source 616 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 618 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 618 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 618 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 618 may provide user equipment devices 602, 604, and 606 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, standalone applications implemented on user equipment devices. For example, the media guidance application may be implemented as software or a set of executable instructions which may be stored in storage 508, and executed by control circuitry 504 of a user equipment device 500. In some embodiments, media guidance applications may be client-server applications where only a client application resides on the user equipment device, and server application resides on a remote server. For example, media guidance applications may be implemented partially as a client application on control circuitry 504 of user equipment device 500 and partially on a remote server as a server application (e.g., media guidance data source 618) running on control circuitry of the remote server. When executed by control circuitry of the remote server (such as media guidance data source 618), the media guidance application may instruct the control circuitry to generate the guidance application displays and transmit the generated displays to the user equipment devices. The server application may instruct the control circuitry of the media guidance data source 618 to transmit data for storage on the user equipment. The client application may instruct control circuitry of the receiving user equipment to generate the guidance application displays.

Content and/or media guidance data delivered to user equipment devices 602, 604, and 606 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 600 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 6.

In one approach, user equipment devices may communicate with each other within a home network. User equipment devices can communicate with each other directly via short-range point-to-point communication schemes described above, via indirect paths through a hub or other similar device provided on a home network, or via communications network 614. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 616 to access content. Specifically, within a home, users of user television equipment 602 and user computer equipment 604 may access the media guidance application to navigate among and locate desirable content. Users may also access the media guidance application outside of the home using wireless user communications devices 606 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 614. These cloud resources may include one or more content sources 616 and one or more media guidance data sources 618. In addition or in the alternative, the remote computing sites may include other user equipment devices, such as user television equipment 602, user computer equipment 604, and wireless user communications device 606. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 604 or wireless user communications device 606 having content capture feature. Alternatively, the user can first transfer the content to a user equipment device, such as user computer equipment 604. The user equipment device storing the content uploads the content to the cloud using a data transmission service on communications network 614. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 5.

As referred herein, the term "in response to" refers to initiated as a result of. For example, a first action being performed in response to a second action may include interstitial steps between the first action and the second action. As referred herein, the term "directly in response to" refers to caused by. For example, a first action being performed directly in response to a second action may not include interstitial steps between the first action and the second action.

Figure 7:
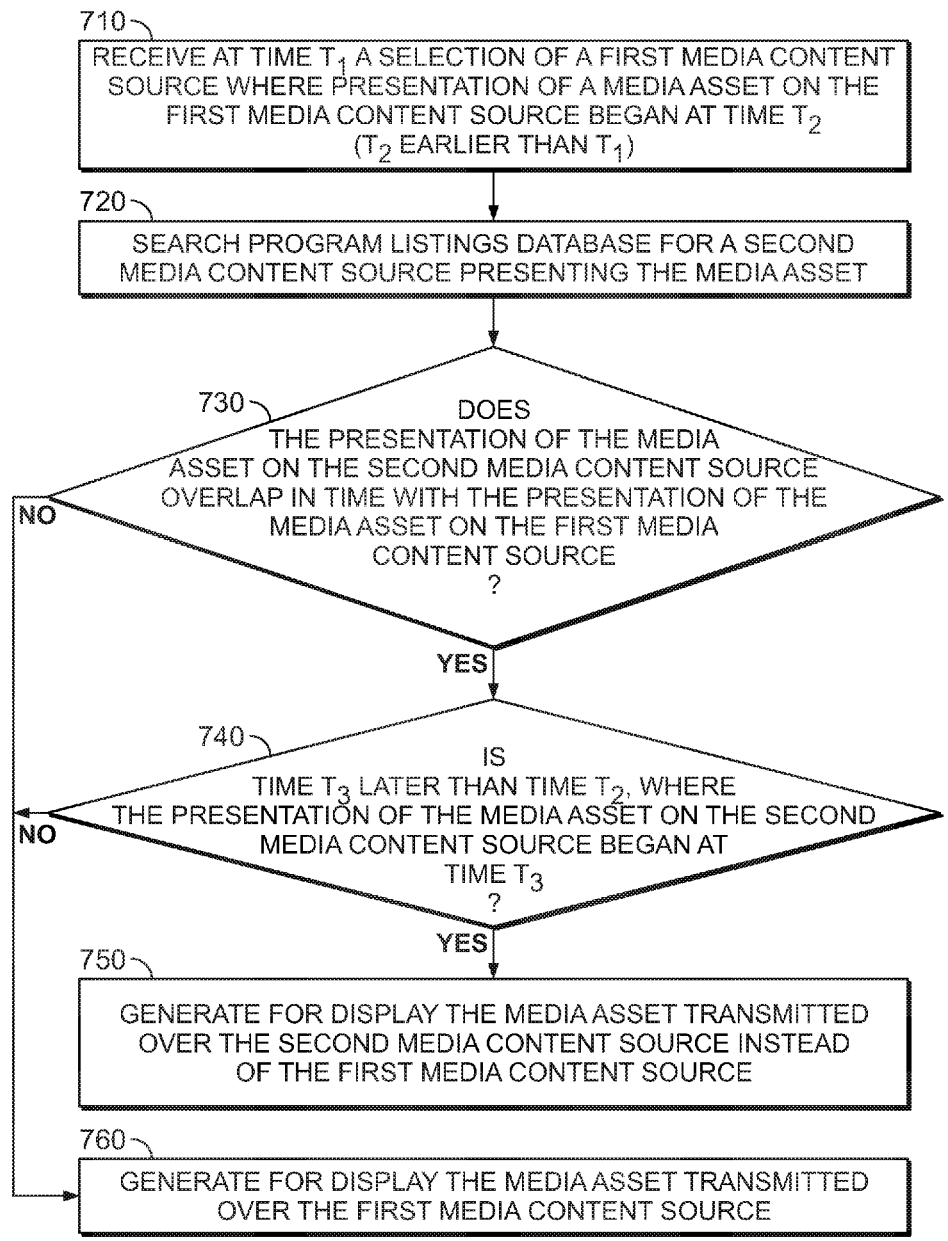
FIG. 7 depicts an illustrative flowchart of a process for determining an alternate media content source, in accordance with some embodiments of the disclosure.

FIG. 7 depicts an illustrative flowchart of a process for presenting alternate sources of media content, in accordance with some embodiments of the disclosure. Process 700 may be executed by control circuitry 504 (e.g., in a manner instructed to control circuitry 504 by the media guidance application). Control circuitry 504 may be part of user equipment (e.g., which may have any or all of the functionality of user television equipment 602, user computer equipment 604, and/or wireless communications device 606), or of a remote server separated from the user equipment by way of communications network 614.

Process 700 begins at 710 where control circuitry 504 may receive at time T1 a selection of a first media content source where presentation of the media asset on the first media content source began at time T2, T2 being earlier than T1. The manner in which control circuitry 504 receives the selection of the media asset is described above with respect to FIG. 1, and such description is equally applicable to 710. For example, time T1 and time T2 may correspond to time 106 and time 102 of FIG. 1 respectively.

At 720, control circuitry 504 may search the program listings database for a second media content source presenting the media asset. In particular, the media asset being presented on the second media content source may be the same media asset being presented on the first media content source. The manner in which control circuitry 504 performs the search of the program listings database is described above with respect to FIG. 1 and such description is equally applicable to 720.

At 730, control circuitry 504 may determine, using the media guidance application, whether the presentation of the media asset on the second media content source overlaps in time with the presentation of the media asset on the first media content source. If the presentation of the media asset on the second media content source does in fact overlap in time with the presentation of the media asset on the first media content source, process 700 continues to 740. Otherwise, process 700 continues to 760 where control circuitry 504, using the media guidance application, generates for display the media asset transmitted over the first media content source. The manner in which control circuitry 504 retrieves performs the search is described above with respect to FIG. 1 and such description is equally applicable to 730.

At 740, control circuitry 504 may determine, using the media guidance application, whether time T3 is later than time T2, where the presentation of the media asset on the second media content source began at time T3. If time T3 is indeed later than time T2, then process 700 continues to 750. Otherwise, process 700 continues to 760. The manner in which control circuitry 504 makes the determination is described above with respect to FIG. 1, and such description is equally applicable to 740. For example, time T3 may correspond to time 104 of FIG. 1.

At 750 control circuitry 504 may generate for display, using the media guidance application, the media asset transmitted over the second media content source instead of the first media content source. The manner in which control circuitry 504 generates the media asset for display is described above with respect to FIG. 1, and such description is equally applicable to 750.

Figure 8:
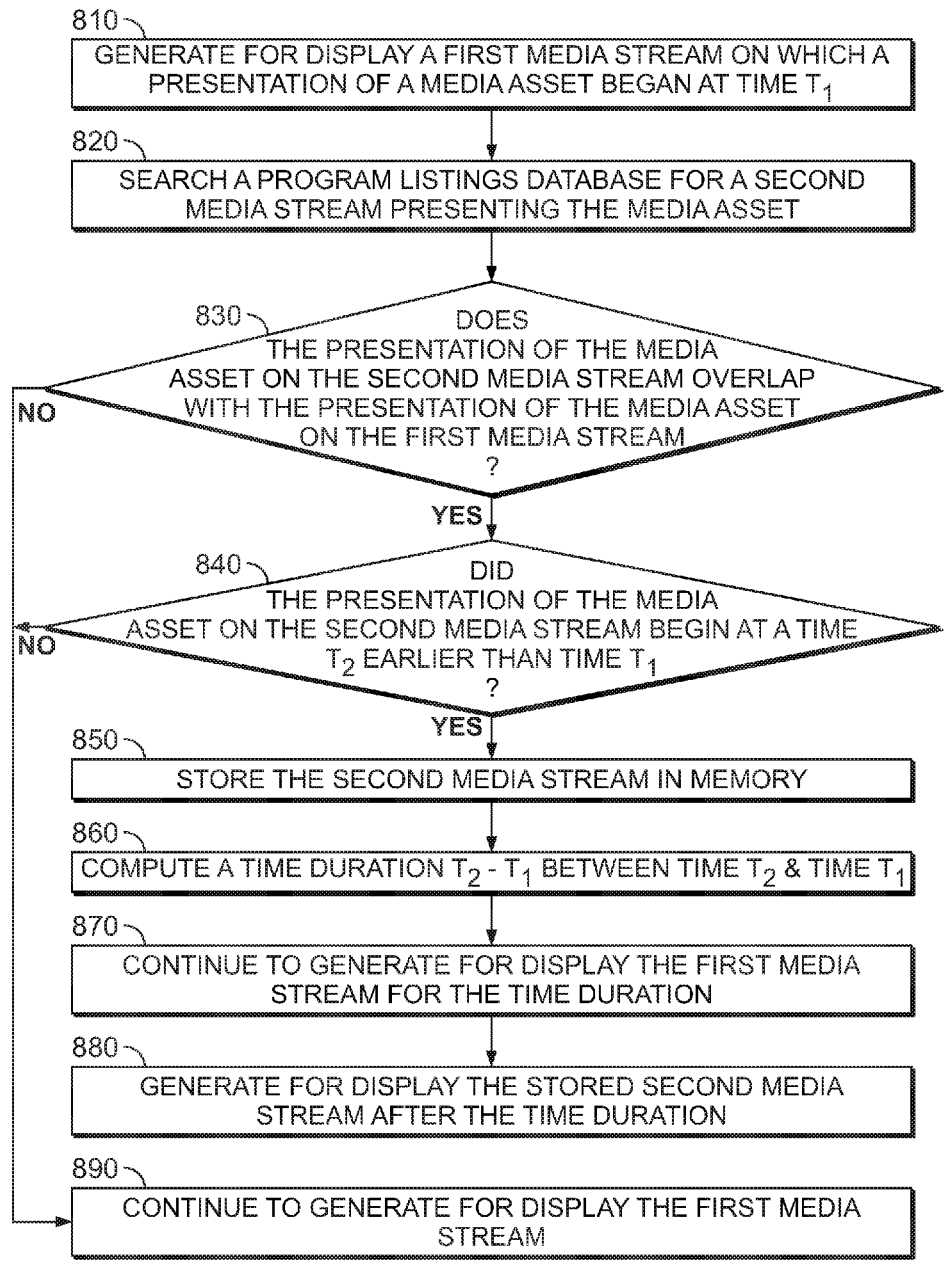
FIG. 8 depicts an illustrative flowchart of a process for controlling the presentation of media streams, in accordance with some embodiments of the disclosure.

FIG. 8 depicts an illustrative flowchart of a process for controlling presentation of media streams, in accordance with some embodiments of the disclosure. Process 800 may be executed by control circuitry 504 (e.g., in a manner instructed to control circuitry 504 by the media guidance application). Control circuitry 504 may be part of user equipment (e.g., which may have any or all of the functionality of user television equipment 602, user computer equipment 604, and/or wireless communications device 606), or of a remote server separated from the user equipment by way of communications network 614.

Process 800 begins at 810 where control circuitry 504 may generate for display, using the media guidance application, the first media stream on which the presentation of a media asset began at time T1. The manner in which control circuitry 504 generates the media asset for display, is described above with respect to FIG. 2, and such description is equally applicable to 810. For example, time T1 may correspond to time 204 of FIG. 2.

At 820, control circuitry 504 may search, using the media guidance application a program listings database, for a second media stream presenting the media asset. The manner in which control circuitry 504 performs the search, is described above with respect to FIG. 2, and such description is equally applicable to 820.

At 830, control circuitry 504 may determine, using the media guidance application, whether the presentation of the media asset on the second media stream overlaps with the presentation of the media asset on the first media stream. If the presentation of the media asset on the second media stream does in fact overlap with the presentation of the media asset on the first media stream, process 800 continues to 840. Otherwise, process 800 continues to 890 where control circuitry 504, using the media guidance application, continues to generate for display the first media stream. The manner in which control circuitry 504 generates the media asset for display, is described above with respect to FIG. 2, and such description is equally applicable to 830.

At 840, control circuitry 504 using, the media guidance application, determines whether the presentation of the media asset on the second media stream began at a time T2 earlier than T1. If the presentation of the media asset on the second media stream began at time T2 earlier than T1, then process 800 continues to 850. Otherwise, process 800 continues to 890. The manner in which control circuitry 504 generates the media asset for display, is described above with respect to FIG. 2, and such description is equally applicable to 840. For example, time T2 may correspond to time 202 of FIG. 2.

At 850, control circuitry 504 may store, using the media guidance application, the second media stream in memory. The manner in which control circuitry 504 stores the second media stream, is described above with respect to FIG. 2, and such description is equally applicable to 850.

At 860, control circuitry 504 may compute, using the media guidance application, the time duration between time T2 and time T1. The manner in which control circuitry 504 generates the media asset for display, is described above with respect to FIG. 2, and such description is equally applicable to 860.

At 870, control circuitry 504 may continue to generate for display, using the media guidance application, the first media stream for the time duration computed at 860. The manner in which control circuitry 504 generates the media asset for display, is described above with respect to FIG. 2, and such description is equally applicable to 870.

At 880, control circuitry 504 may generate for display, using the media guidance application, the stored second media stream after the time duration computed at 860. The manner in which control circuitry 504 generates the media asset for display, is described above with respect to FIG. 2, and such description is equally applicable to 880.

Figure 9:
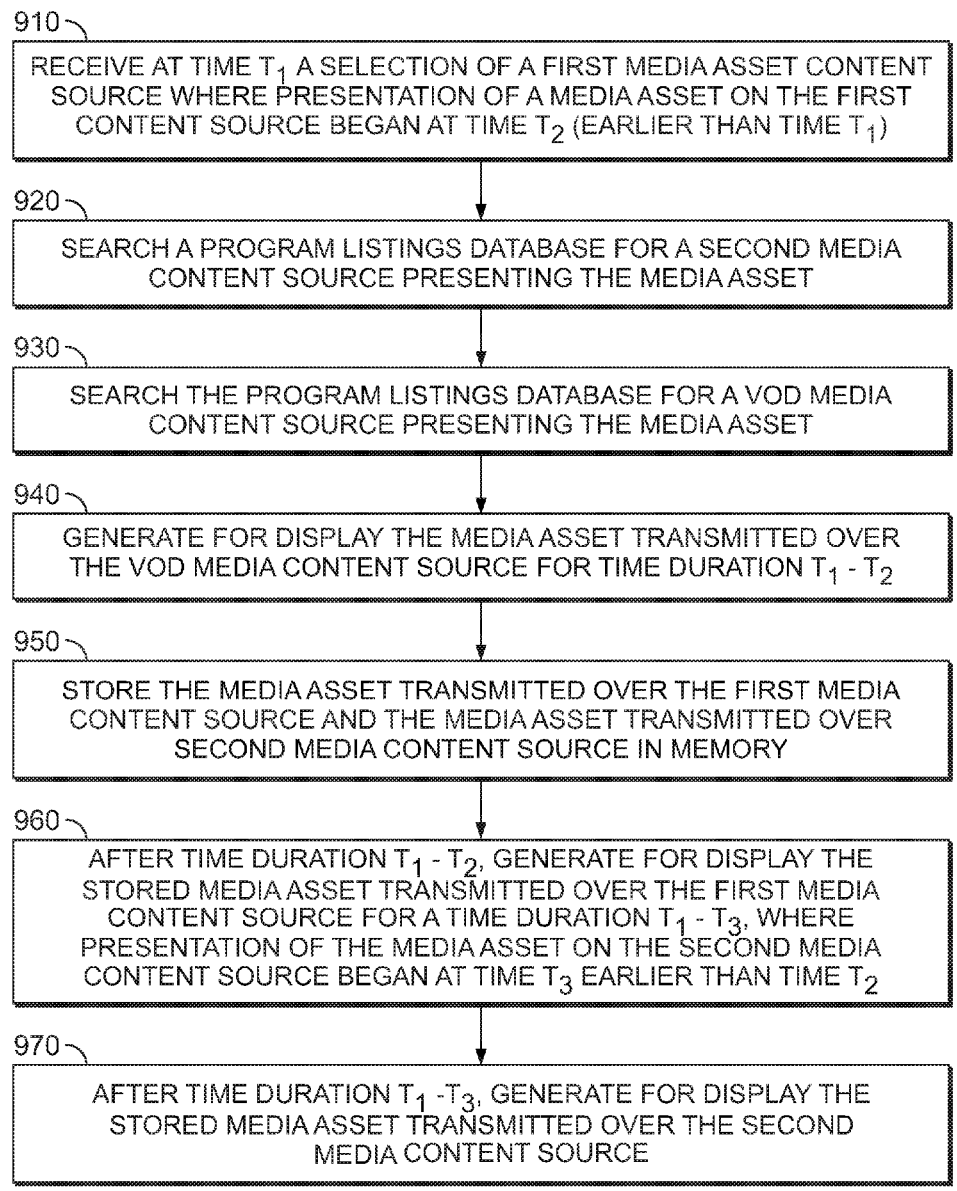
FIG. 9 depicts an illustrative flowchart of a process for controlling the presentation of media streams, in accordance with some embodiments of the disclosure.

FIG. 9 depicts an illustrative flowchart of a process for controlling presentation of media streams, in accordance with some embodiments of the disclosure. Process 900 may be executed by control circuitry 504 (e.g., in a manner instructed to control circuitry 504 by the media guidance application). Control circuitry 504 may be part of user equipment (e.g., which may have any or all of the functionality of user television equipment 602, user computer equipment 604, and/or wireless communications device 606), or of a remote server separated from the user equipment by way of communications network 614.

Process 900 begins at 910 where control circuitry 504 may receive at time T1, using the media guidance application, a selection of a first media content source where the presentation of a media asset on the first media content source began at time T2, T2 being earlier than T1. The manner in which control circuitry 504 generates the media asset for display, is described above with respect to FIG. 2, and such description is equally applicable to 910. For example, times T1 and T2 may correspond to time 206 and time 202 respectively.

At 920, control circuitry 504 may search, using the media guidance application a program listings database, for a second media content source presenting the media asset. The manner in which control circuitry 504 performs the search, is described above with respect to FIG. 2, and such description is equally applicable to 920.

At 930, control circuitry 504 may search, using the media guidance application, a program listings database, for a video on demand media content source presenting the media asset. The manner in which control circuitry 504 performs the search, is described above with respect to FIG. 2, and such description is equally applicable to 930.

At 940, control circuitry 504 may generate for display, using the media guidance application, the media asset transmitted over the video on demand media content source for time duration T1-T2. The manner in which control circuitry 504 generates the media asset for display, is described above with respect to FIG. 2, and such description is equally applicable to 940.

At 950, control circuitry 504 may store, using the media guidance application a program listings database, the media asset transmitted over the first media content source and the media asset transmitted over the second media content source in memory. The manner in which control circuitry 504 performs the search, is described above with respect to FIG. 2, and such description is equally applicable to 950.

At 960, control circuitry 504 may generate for display, using the media guidance application, after time duration T1-T2, the stored media asset transmitted over the first media content source for a time duration T1-T3, where presentation of the media asset on the second media content source began at a time T3, T3 being earlier than T2. The manner in which control circuitry 504 generates the stored media asset for display, is described above with respect to FIG. 2, and such description is equally applicable to 960.

At 970, control circuitry 504 may generate for display, using the media guidance application, after time duration T1-T3, the stored media asset transmitted over the second media content source. The manner in which control circuitry 504 generates the stored media asset for display, is described above with respect to FIG. 2, and such description is equally applicable to 970.

It should be noted that processes 700-900 or any step thereof could be performed on, or provided by, any of the devices shown in FIGS. 5-6. For example, any of processes 700-900 may be executed by control circuitry 504 (FIG. 5) as instructed by control circuitry implemented on user equipment 602, 604, 606 (FIG. 6), and/or a user equipment for selecting a recommendation. In addition, one or more steps of processes 700-900 may be incorporated into or combined with one or more steps of any other process or embodiment.

It is contemplated that the steps or descriptions of each of FIGS. 7-9 may be used with any other embodiment of this disclosure. In addition, the steps and descriptions described in relation to FIGS. 7-9 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 5-6 could be used to perform one or more of the steps in FIGS. 7-9.

It will be apparent to those of ordinary skill in the art that methods involved in the present invention may be embodied in a computer program product that includes a computer-usable and/or readable medium. For example, such a computer-usable medium may consist of a read-only memory device, such as a CD-ROM disk or conventional ROM device, or a random access memory, such as a hard drive device or a computer diskette, having a computer-readable program code stored thereon. It should also be understood that methods, techniques, and processes involved in the present disclosure may be executed using processing circuitry. For instance, determining planned activities of a user may be performed, e.g., by processing circuitry 506 of FIG. 5. The processing circuitry, for instance, may be a general purpose processor, a customized integrated circuit (e.g., an ASIC), or a field-programmable gate array (FPGA) within user equipment 500, media content source 616, or media guidance data source 618. For example, a profile, as described herein, may be stored in, and retrieved from, storage 508 of FIG. 5, or media guidance data source 618 of FIG. 6. Furthermore, processing circuitry, or a computer program, may update settings of the home security application, such as volume settings or time restriction settings, stored within storage 508 of FIG. 5 or media guidance data source 618 of FIG. 6.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

While some portions of this disclosure may make reference to "convention," any such reference is merely for the purpose of providing context to the invention(s) of the instant disclosure, and does not form any admission as to what constitutes the state of the art.

What is claimed is:

1. A method for selecting a media stream for display based on reducing a time duration required to consume a media asset, the method comprising:
 generating for display a first media stream, wherein a presentation of a media asset on the first media stream began at a first time;
 searching a program listings database for a second media stream presenting the media asset, wherein a presentation of the media asset on the second media stream:
  overlaps in time with the presentation of the media asset on the first media stream; and
  began at a second time earlier than the first time;
 storing, in memory, the second media stream;
 computing a time duration between the first time and the second time;
 continuing to generate for display the first media stream for the time duration; and
 generating for display the stored second media stream after the time duration.

2. The method of claim 1, wherein the time duration is a first time duration, and wherein computing the first time duration further comprises:
 determining that the second media stream included an advertisement between the first time and the second time;
 computing a second time duration corresponding to a length of the advertisement; and
 subtracting the second time duration from the first time duration.

3. The method of claim 1, wherein searching the program listings database further comprises:
 finding a plurality of media streams presenting the media asset, wherein presentation of the media asset on each of the plurality of media streams overlaps in time with the presentation of the media asset on the first media stream, and began at a time earlier than the first time; and
 determining, from the plurality of media streams, a media stream on which the presentation of the media asset began earliest in time; and
 selecting the media stream as the second media stream.

4. The method of claim 1, wherein storing the second media stream further comprises:
 identifying a location of an advertisement in the second media stream; and
 storing the second media stream without the advertisement at the location identified in the second media stream.

5. The method of claim 1, wherein generating for display the stored second media stream further comprises:
 identifying a location of an advertisement in the stored second media stream; and
 generating for display the stored second media stream without the advertisement at the location identified in the second media stream.

6. The method of claim 5, further comprising:
 generating for display an option prompting a user to watch the advertisement before generating for display the stored second media stream after the time duration.

7. The method of claim 1 further comprising:
 generating for display an option allowing a user to continue generating for display the first media stream after the time duration.

8. The method of claim 1, wherein the time duration is a first time duration and wherein a request to generate for display the first media stream was received at a third time, further comprising:
 searching a program listings database for a video on demand (VOD) media stream presenting the media asset;
 computing a second time duration between the first time and the third time; and generating for display, at the third time, the media asset transmitted over the VOD media stream for the second time duration instead of the media asset transmitted over the first media stream.

9. The method of claim 8 further comprising:
storing, in the memory, the first media stream;
computing a third time duration between the third time and the second time; and
generating for display, after the second time duration, the stored first media stream for the third time duration.

10. The method of claim 9 further comprising:
generating for display the stored second media stream after the third time duration.

11. A system for selecting a media stream for display based on reducing a time duration required to consume a media asset, the system comprising:
a memory; and
a processor configured to:
generate for display a first media stream, wherein a presentation of a media asset on the first media stream began at a first time;
search a program listings database for a second media stream presenting the media asset, wherein a presentation of the media asset on the second media stream:
overlaps in time with the presentation of the media asset on the first media stream; and
began at a second time earlier than the first time;
store, in the memory, the second media stream;
compute a time duration between the first time and the second time;
continue to generate for display the first media stream for the time duration; and
generate for display the stored second media stream after the time duration.

12. The system of claim 11, wherein the time duration is a first time duration, and wherein the processor is further configured to compute the first time duration by:
determining that the second media stream included an advertisement between the first time and the second time;
computing a second time duration corresponding to a length of the advertisement; and
subtracting the second time duration from the first time duration.

13. The system of claim 11, wherein the processor is further configured to search the program listings database by:
finding a plurality of media streams presenting the media asset, wherein presentation of the media asset on each of the plurality of media streams overlaps in time with the presentation of the media asset on the first media stream, and began at a time earlier than the first time; and determining, from the plurality of media streams, a media stream on which the presentation of the media asset began earliest in time; and
selecting the media stream as the second media stream.

14. The system of claim 11, wherein the processor is further configured to store the second media stream by:
identifying a location of an advertisement in the second media stream; and
storing the second media stream without the advertisement at the location identified in the second media stream.

15. The system of claim 11, wherein the processor is further configured to generate for display the stored second media stream by:
identifying a location of an advertisement in the stored second media stream; and
generating for display the stored second media stream without the advertisement at the location identified in the second media stream.

16. The system of claim 15, wherein the processor is further configured to:
generate for display an option prompting a user to watch the advertisement before generating for display the stored second media stream after the time duration.

17. The system of claim 11, wherein the processor is further configured to:
generate for display an option allowing a user to continue generating for display the first media stream after the time duration.

18. The system of claim 11, wherein the time duration is a first time duration, and wherein a request to generate for display the first media stream was received at a third time, and wherein the processor is further configured to:
search a program listings database for a video on demand (VOD) media stream presenting the media asset;
compute a second time duration between the first time and the third time; and
generate for display, at the third time, the media asset transmitted over the VOD media stream for the second time duration instead of the media asset transmitted over the first media stream.

19. The system of claim 18, wherein the processor is further configured to:
store, in the memory, the first media stream;
compute a third time duration between the third time and the second time; and
generate for display, after the second time duration, the stored first media stream for the third time duration.

20. The system of claim 19, wherein the processor is further configured to generate for display the stored second media stream after the third time duration.

* * * * *